United States Patent
Gilliland et al.

(10) Patent No.: US 6,607,307 B2
(45) Date of Patent: Aug. 19, 2003

(54) TRANSCEIVER MODULE HAVING VARIABLE VOLTAGE CAPABILITY

(75) Inventors: Patrick B. Gilliland, Chicago, IL (US); Evgueniy D. Anguelov, River Grove, IL (US)

(73) Assignee: Stratos Lightwave, Chicago, IL (US)

( * ) Notice: Subject to any disclaimer, the term of this patent is extended or adjusted under 35 U.S.C. 154(b) by 55 days.

(21) Appl. No.: 09/873,077

(22) Filed: Jun. 1, 2001

(65) Prior Publication Data

US 2002/0181895 A1 Dec. 5, 2002

(51) Int. Cl.⁷ ................................................. G02B 6/36
(52) U.S. Cl. ............................ 385/88; 385/53; 359/152
(58) Field of Search ................................ 359/152, 153, 359/189, 110; 385/88, 53, 24; 372/31, 23

(56) References Cited

U.S. PATENT DOCUMENTS

| | | | |
|---|---|---|---|
| 5,237,441 A | 8/1993 | Nbu ............................ | 359/152 |
| 5,258,868 A | 11/1993 | Jenson et al. ................ | 359/168 |
| 5,592,284 A | 1/1997 | Bedard ....................... | 356/73.1 |
| 5,656,931 A | 8/1997 | Lau et al. .................... | 324/522 |
| 5,999,299 A | 12/1999 | Chan et al. .................. | 359/172 |

OTHER PUBLICATIONS

Maxim Integrated Products Brochure No. MAX1759; Buck/Boost Regulating Charge Pump in u Max; dtd 1901600, Rev 0; 1/00.

Maxim Integrated Products Brochure No. MAX 1672; Step–Up/Down DC–DC Converter in QSOP Package; dtd 19–1307, Rev 0a; 11/97.

Analog Devices, Inc., 1996; Brochure No. ADP1111; Rev. O; Micropower Step–Up/Step–Down SW Regulator; Adjustable and Fixed 3.3V, 5V, 12V.

*Primary Examiner*—Hemang Sanghavi
*Assistant Examiner*—Eric Wong
(74) *Attorney, Agent, or Firm*—Steven M. Evans

(57) ABSTRACT

An optoelectronic transceiver module comprising a housing having a first opening at a first end and a second opening at a second end; a printed circuit board mounted within the housing; an electrical connector on the printed circuit board at the first end of the optoelectronic transceiver module, the electrical connector having an insulative mating surface within the first opening and including a first side with electrical contacts in an area oriented substantially parallel to the first side of the insulative mating surface, wherein the electrical contacts slidingly engage a circuit card connector of a host receptacle in order to quickly install and remove the optoelectronic transceiver module from within the circuit card connector; an optical assembly connected to the printed circuit board at the second end of the optoelectronic transceiver module, the optical assembly including a transmitting optical subassembly and a receiving optical subassembly, the second opening allowing the optical assembly to communicate outside of the housing in order for the optical assembly to be coupled with a duplex fiber optic plug providing for bi-directional data transmission over an optical data link; and a voltage converter circuit within the housing having a predetermined internal output voltage consistent with an internal operating voltage of the transceiver module, wherein an external supply voltage varying within a predetermined range received by the voltage converter is converted to the predetermined internal operating voltage of the transceiver module, thereby enabling the transceiver module to operate properly at various external supply voltages.

20 Claims, 10 Drawing Sheets

Conventional GBIC Module
(PRIOR ART)

TRANSCEIVER MODULE HAVING VARIABLE VOLTAGE CAPABILITY

FIELD OF THE INVENTION

The present invention relates generally to optical transceiver modules, and more particularly, to a transceiver module capable of operating at variable voltage levels.

BACKGROUND OF THE INVENTION

Removable serial transceiver modules, such as GBICs, are designed to provide gigabaud capability for Fibre Channel (FC) and other protocols that use similar optical fiber links. In general terms, the GBIC provides an interface between a serial duplex optical interface, such as an FC port, and a serial duplex electrical device such as a serializer/deserializer (SERDES). The electrical connector specified for a GBIC is a 20-pin Single Connector Attachment (SCA-20), which is a male ribbon style connector. GBICs also exist to connect to connect electrical cables to SERDES devices. Therefore a transceiver module can be optical/electrical or electrical/electrical.

GBICs are designed to be "hot-pluggable," meaning the host system can remain powered on during installation of a GBIC. More detailed information of the GBIC is provided in the "SFF Committee Proposed Specification for GBIC (Gigabit Interface Converter)," Revision 5.5, dated Sep. 27, 2000, which is hereby incorporated by reference.

Transceiver modules are designed to operate at a set supply voltage level within an acceptable tolerance. In recent years, however, desired supply voltage levels for transceiver modules, such as the GBIC, are changing. For example, a conventional GBIC typically operates at a supply voltage level of 5 volts, with up to 10% tolerance.

Due to the demand for a continued increase in operating speed, power efficiency, lower power dissipation, and smaller component size, supply voltage levels for transceiver modules are decreasing. For example, some current supply voltage levels are 3.3 volts and 2.5 volts. Of course, additional supply voltage levels and ranges are possible and likely to be developed. Furthermore, it is even possible that some transceiver modules are designed to operate at higher supply voltage levels.

In order to accommodate these various supply voltage levels, a manufacturer of a transceiver module must know beforehand the desired supply voltage level for a device in order to design the device accordingly. This requires a supplier of transceiver modules to either have multiple designs in stock for each supply voltage level, or design a transceiver module for each unique order of transceiver modules. This process is costly, inefficient, and slows production time.

It would be far more cost effective, efficient, and decrease production time to have a transceiver module that can operate at various supply voltage levels without having to be modified. In this manner, only one type of transceiver module would need to be produced or held in stock by a supplier in order to accommodate the various supply voltage level demands by customers of transceiver modules.

OBJECTS AND SUMMARY OF THE INVENTION

An object of the present invention is to provide a single transceiver module that can operate at various supply voltage levels without being modified.

In that regard, a transceiver module is provided comprising a housing having a first opening at a first end and a second opening at a second end; a printed circuit board mounted within the housing; an electrical connector on the printed circuit board at the first end of the optoelectronic transceiver module, the electrical connector having an insulative mating surface within the first opening and including a first side with electrical contacts in an area oriented substantially parallel to the first side of the insulative mating surface, wherein the electrical contacts slidingly engage a circuit card connector of a host receptacle in order to quickly install and remove the optoelectronic transceiver module from within the host receptacle; an optical assembly connected to the printed circuit board at the second end of the optoelectronic transceiver module, the optical assembly including a transmitting optical subassembly and a receiving optical subassembly, the second opening allowing the optical assembly to communicate outside of the housing in order for the optical assembly to be coupled with a duplex fiber optic plug providing for bi-directional data transmission over an optical data link; and a voltage converter circuit within the housing having a predetermined internal output voltage consistent with a internal operating voltage of the transceiver module, wherein an external supply voltage varying within a predetermined range received by the voltage converter is converted to the predetermined internal operating voltage of the transceiver module, thereby enabling the transceiver module to operate properly at various external supply voltages.

BRIEF DESCRIPTION OF THE DRAWINGS

FIG. 1b is a bottom view of the GBIC housing shown in FIG. 1a;

FIG. 1d is an end view of the GBIC housing shown in and taken along line 1d–1d of FIGS. 1a and 1b;

FIG. 1e is an end view of the GBIC housing shown in and taken along line 1e–1e of FIGS. 1a and 1b;

DETAILED DESCRIPTION OF THE PREFERRED EMBODIMENTS

Figure 1C:
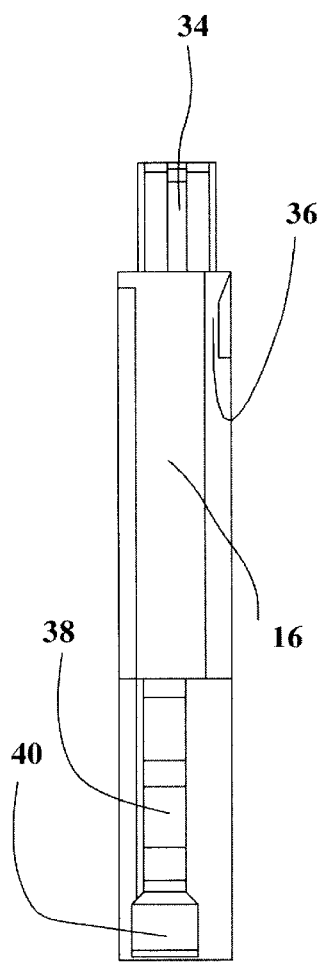
FIG. 1c is a side view of the GBIC housing shown in and taken along line 1c–1c of FIGS. 1a and 1b.
Figure 1A:
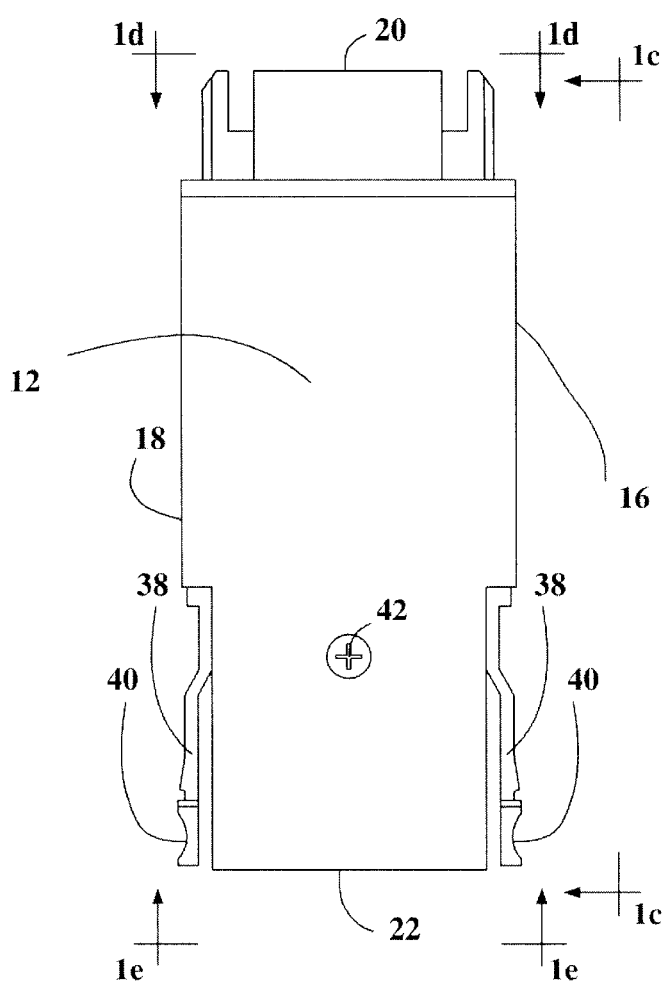
FIG. 1a is a plan view of a conventional GBIC housing.
Figures 1B, 1D, 1E:
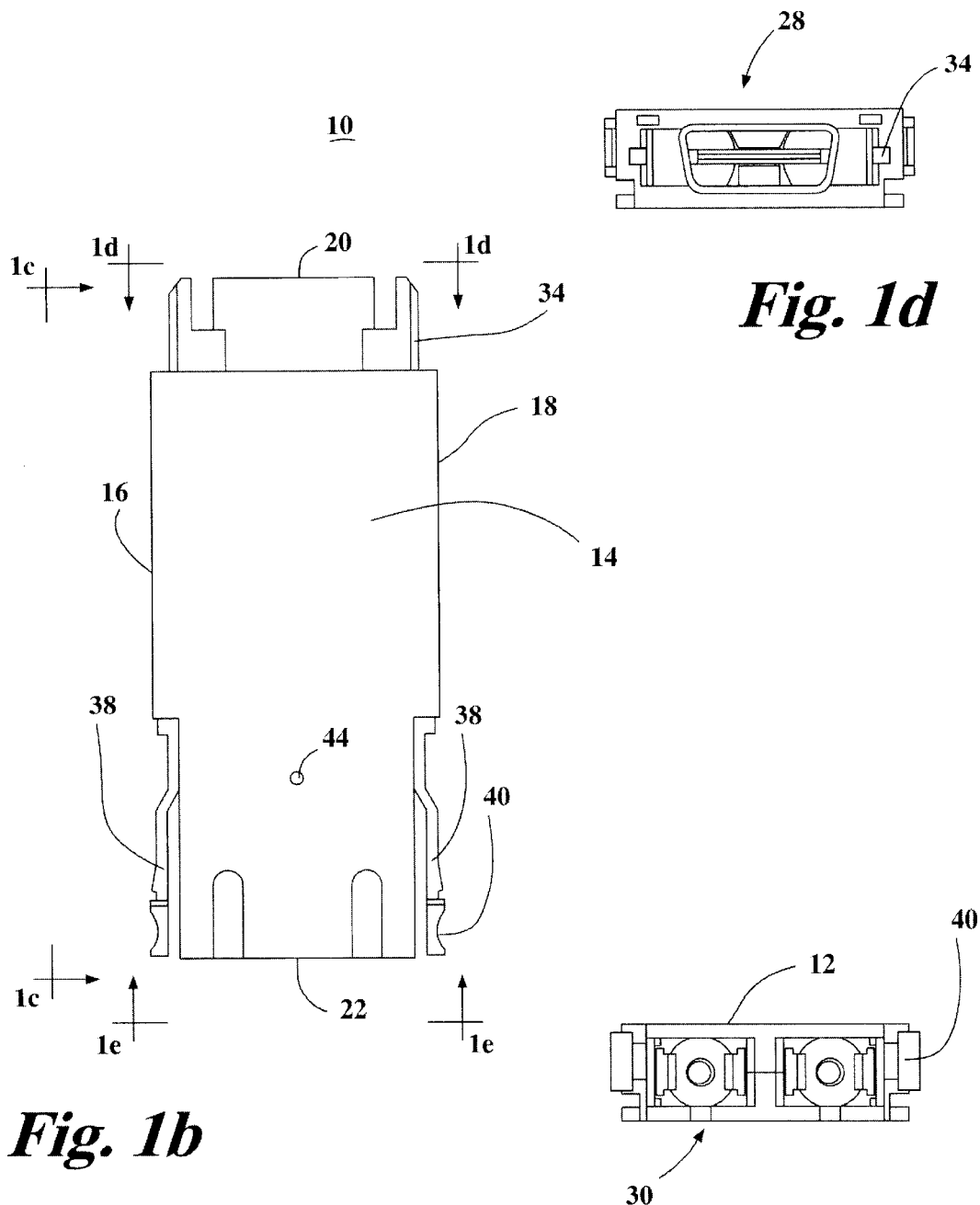

Referring now to the drawings, FIGS. 1a–1e show an outer housing 10 of a conventional GBIC module 13 (FIG. 3), capable of incorporating the present invention. A top 12, bottom 14, and sides 16, 18 are illustrated. A first end 20 and a second end 22 are located at opposing ends of the housing 10. An electrical connector 28, such as a 20-pin Single Connector Attachment (SCA), is located at the first end 20 and configured to mate with a host receptacle. An optical connector 30 is located at the second end 22.

Guide tabs 34 are located on the first end 20 to facilitate inserting the electrical connector 28 into a host receptacle and also provide grounding. Guide slots 36 are included for properly positioning the GBIC housing 10 during insertion into a host receptacle. Release levers 38 are located on sides 16 and 18 in order to secure the GBIC housing 10 within a host receptacle, and then release the GBIC housing 10 from a host receptacle in response to finger grips 40 on the release levers 38 being depressed inward toward the GBIC housing 10. A metal screw 42 on the top 12 of the housing 10 secures the top 12 and bottom 14 of the housing 10 together by screwing into an aperture 44 in the bottom 14 of the housing 10.

Figure 2:
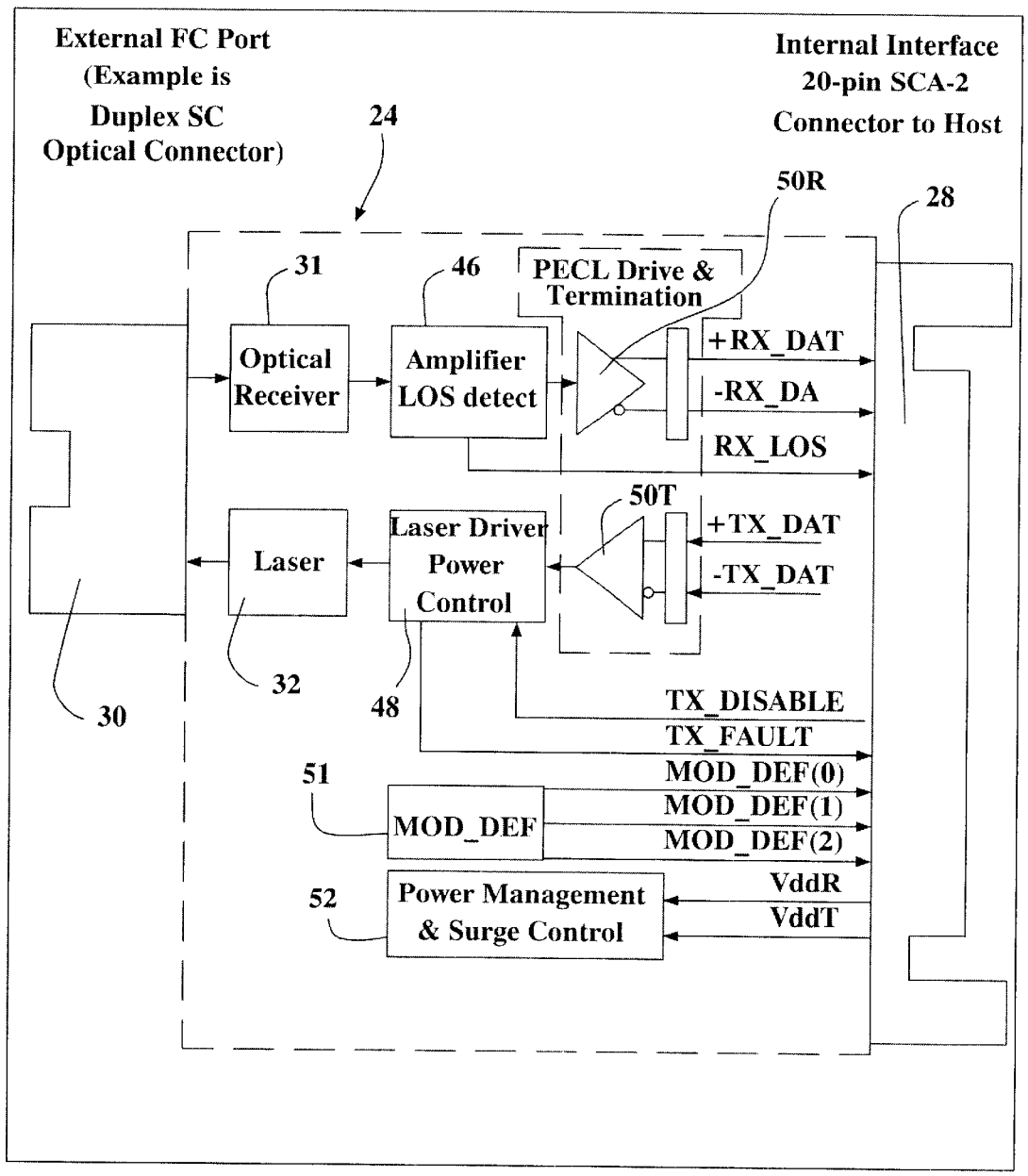
FIG. 2 is a circuit block diagram of a conventional GBIC module.

FIG. 2 is a circuit block diagram of a prior art GBIC circuit assembly 24 of a GBIC module 13. The GBIC circuit assembly 24 is located within the GBIC housing 10 to form a GBIC module 13. Shown are the electrical connector 28 and the optical connector 30. The optical connector 30 includes the optical receiver 31, and the optical transmitter includes connectorized laser diode 32. An amplifier equipped with loss-of-signal (LOS) detector circuitry 46 is coupled to the optical receiver 31, and a laser driver and automatic power control circuit 48 is coupled to the optical transmitter 32. A Positive Emitter Coupled Logic (PECL) drive circuit 50T, a receiver termination circuit 50R, and a module definition (MOD_DEF) circuit 51 are also illustrated. The power management and surge control circuit 52 distributes power to all circuits internally and protects against external power transient events. The power management and surge control circuit 52 is significant to the present invention, as discussed in regard to FIG. 3.

Figure 3:
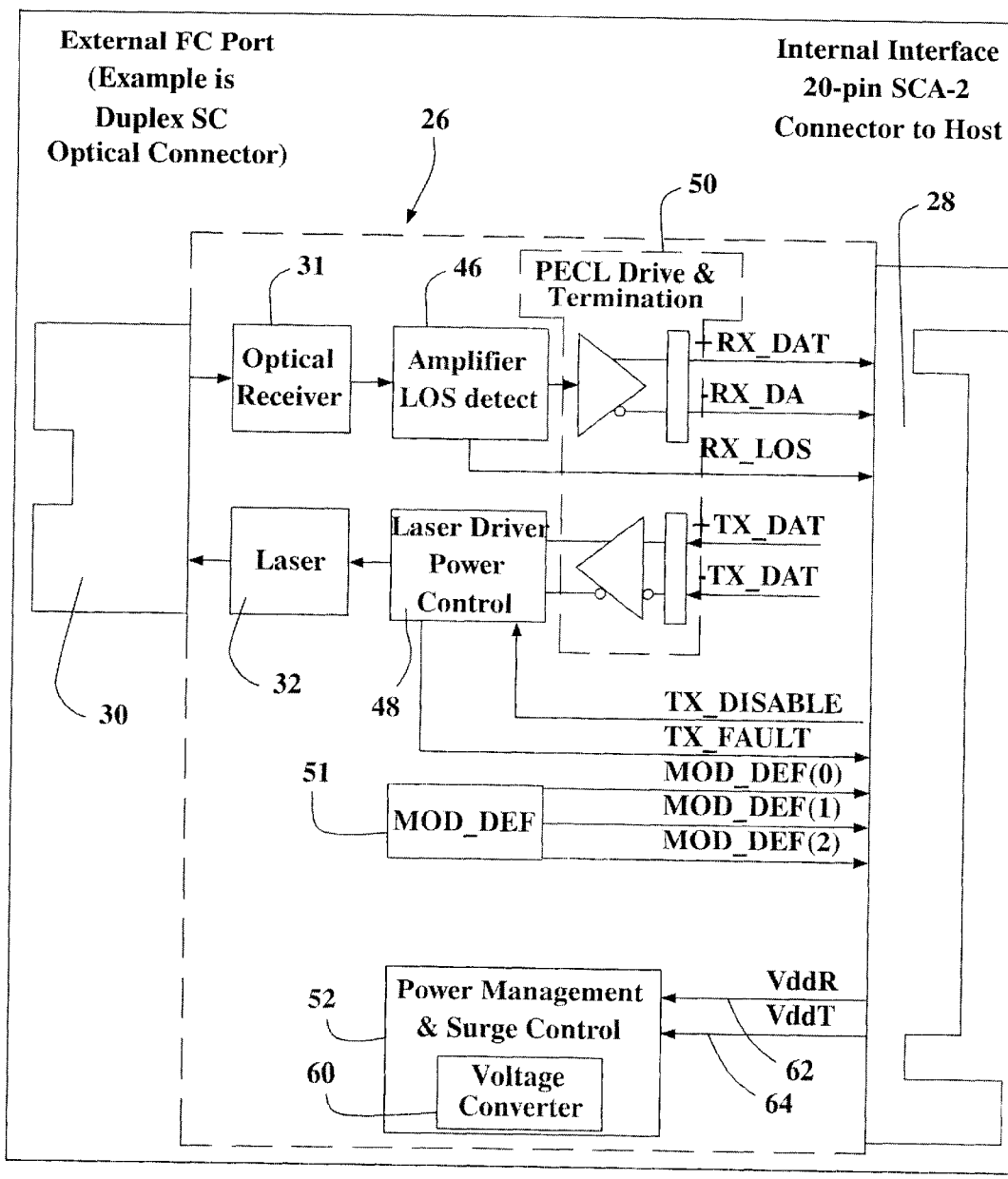
FIG. 3 is a circuit block diagram of a GBIC module configured in accordance with the present invention.

FIG. 3 is a block diagram of a GBIC assembly 26 in a GBIC module 15 configured in accordance with the present invention. FIG. 3 is similar to FIG. 2, except the power management and surge control circuit 52 includes a voltage converter circuit 60 in accordance with the present invention.

In accordance with the present invention, a voltage converter circuit is included in a GBIC module to adjust power supply voltage levels applied to the GBIC module to a set internal operating voltage. In this manner, the internal operating voltage level of the GBIC module remains the same, regardless of the power supply voltage level. As such, the same GBIC module can function properly at various power supply voltage level environments.

Figure 4:
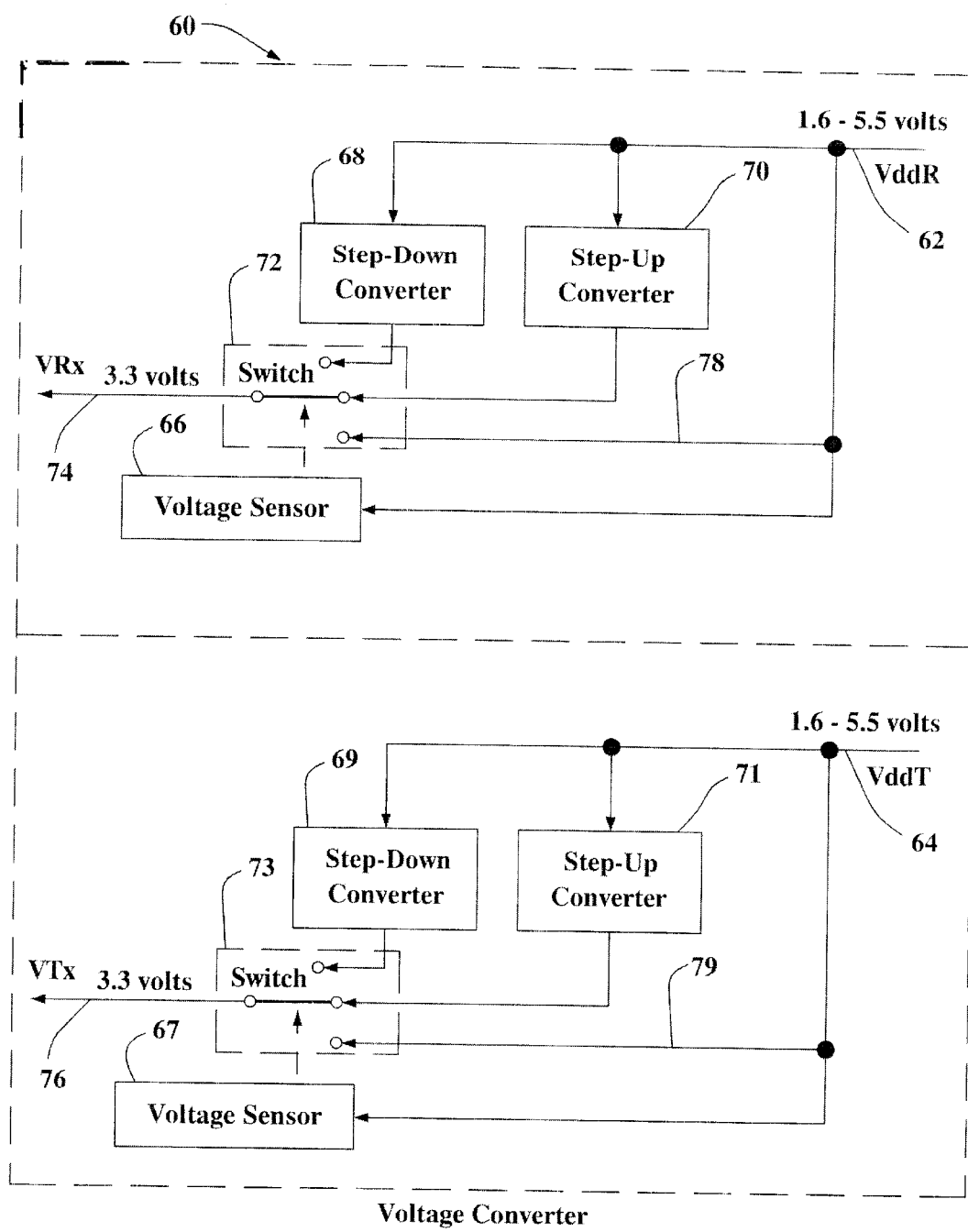
FIG. 4 is a circuit block diagram of the voltage converter shown in FIG. 3.

FIG. 4 is a block diagram of the voltage converter 60 configured in accordance with the present invention. $V_{DD}R$ 62 is to be connected to the external power supply voltage for the optical receiver 31 of the GBIC module 15 (FIG. 3). $V_{DD}T$ 64 is to be connected to the external power supply voltage for the optical transmitter 32 of the GBIC module 15. The external supply voltage on lines $V_{DD}R$ 62 and $V_{DD}T$ 64 can range from 1.6–5.5 volts. In other embodiments, the external supply voltage on lines $V_{DD}R$ 62 and $V_{DD}T$ 64 can range from 1.8–11 volts.

Voltage sensors 66 and 67 monitor the incoming voltages on $V_{DD}R$ 62 and $V_{DD}T$ 64, respectively. The incoming external supply voltage levels on lines 62 and 64 are also fed into Step-Down Converters 68 and 69, respectively. Similarly, the incoming voltage levels on lines 62 and 64 are fed into Step-Up Converters 70 and 71, respectively. The voltage sensors 66 and 67 control switches 72 and 73, respectively. The switches 72 and 73 determine whether output from the Step-Up Converters 70,71 or output from the Step-Down Converters 68,69 are to be connected to the internal power lines $VR_X$ 74 and $VT_X$ 76, respectively. Furthermore, the voltage sensors 66 and 67 determine if the voltage level on lines 62 and 64 are to be fed directly to the internal power lines $VR_X$ 74 and $VT_X$ 76, respectively. This would occur in the situation wherein the external power supply voltage level on lines 62 and/or 64 are equal to the predetermined internal operating voltage level of the GBIC module 15, and do not need to be adjusted by the voltage converter 60.

The Step-Up converters 70,71 raise all incoming voltages to the predetermined, internal power supply voltage level. The Step-Down Converters 68,69 lower all incoming voltages to the predetermined, internal power voltage lever.

The predetermined or pre-set, internal supply voltage level for the GBIC module 15 is established, such as, 3.3 volts. If the external power supply voltage levels on lines 62 and 64 is above 3.3 volts, the voltage sensors 66,67 direct the switches 72,73 to connect output from the Step-Down Converters 68,69 to internal power lines $VR_X$ 74 and $VT_X$ 76. If the voltage levels on lines 62 and 64 are below 3.3 volts, the voltage sensors 66,67 direct the switches 72,73 to connect output from the Step-Up Converters 70,71 to internal power lines $VR_X$ 74 and $VT_X$ 76. If the voltage levels on lines 62 and 64 are equal to 3.3 volts, the voltage sensors 66,67 direct the switches 72,73 to connect output directly from the lines 62,64 to the internal power lines $VR_X$ 74 and $VT_X$ 76 via non-converted lines 78 and 79, respectively.

It should be noted that it is possible that the external supply voltage level on line 62 is above the internal supply voltage level, and the external supply voltage level on line 64 is below the internal supply voltage level, or vice versa. Furthermore, the voltage level on line 62 may need to be converted and the voltage level on line 64 may not need to be converted, or vice versa. Regardless, the voltage sensors 66 and 67 are capable of independently accommodating any voltage level discrepancy, and setting the switches 72 and 73 appropriately so that the proper voltage level conversions are performed and communicated to internal power supply lines 74 and 76. This enables the GBIC to operate properly regardless of the different external supply voltage levels on lines 62 and 64.

Figure 5A:
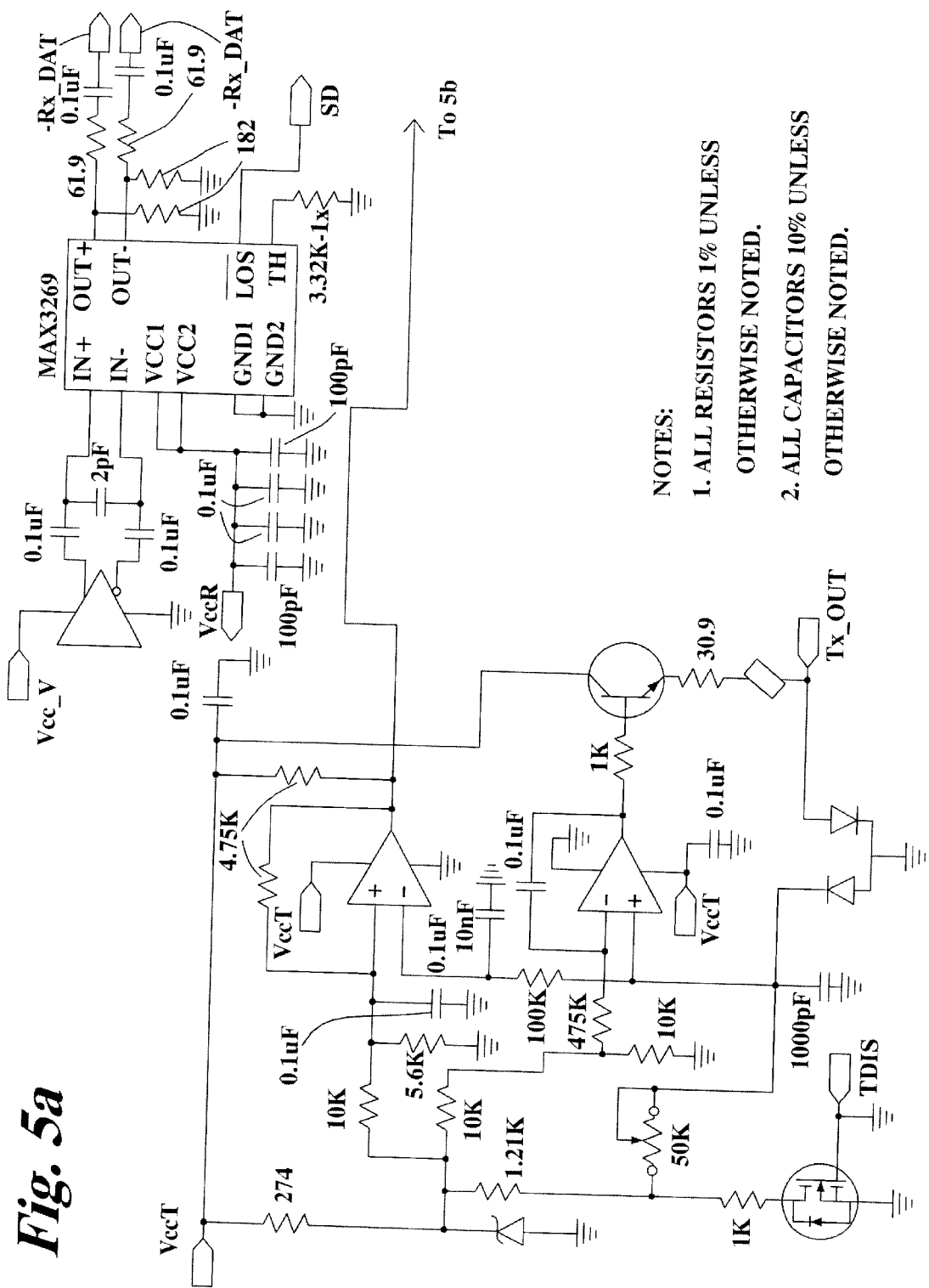
FIGS. 5a–5d are a circuit diagram of a GBIC configured in accordance a preferred embodiment of the present invention.
Figure 5B:
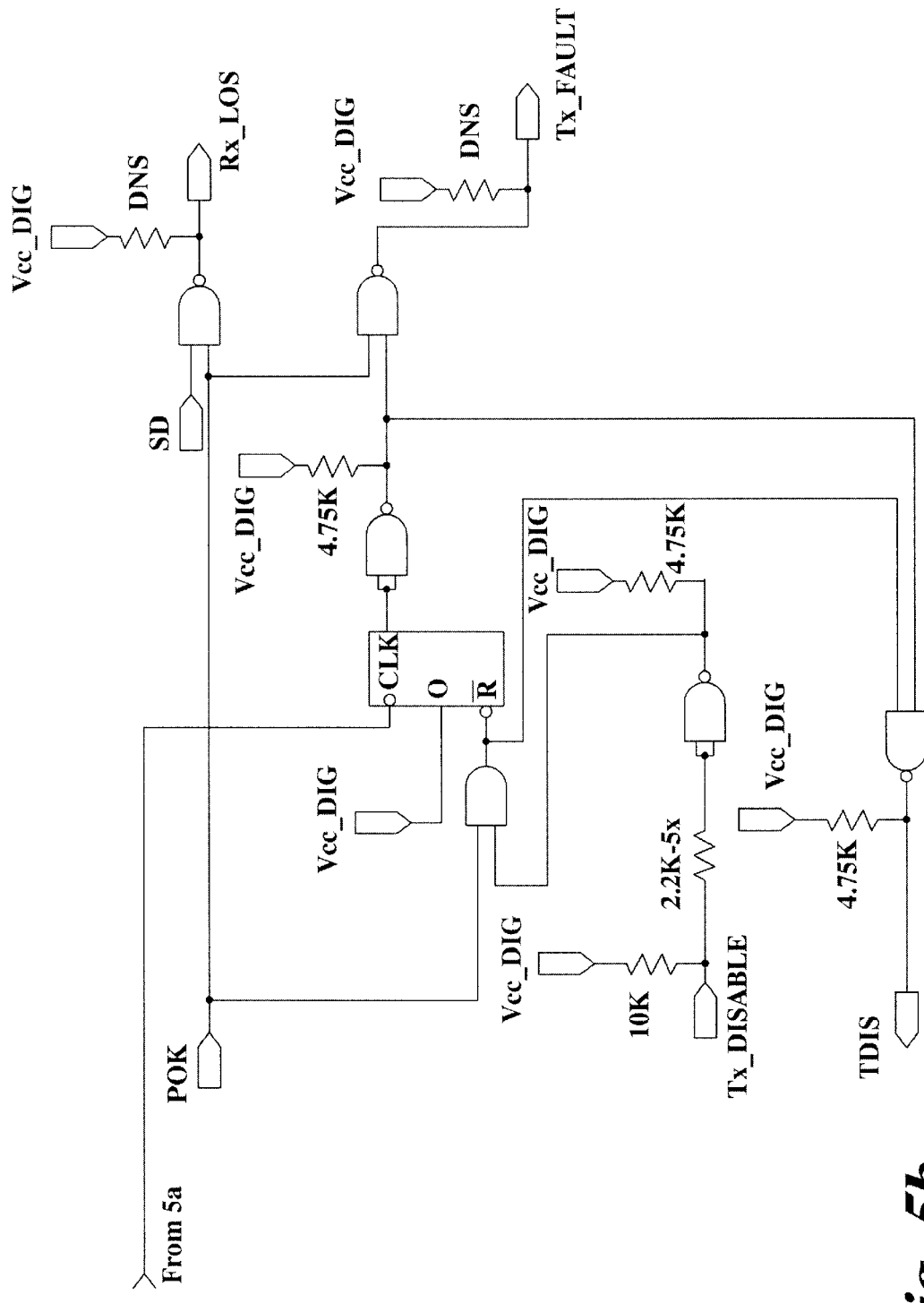
Figure 5C:
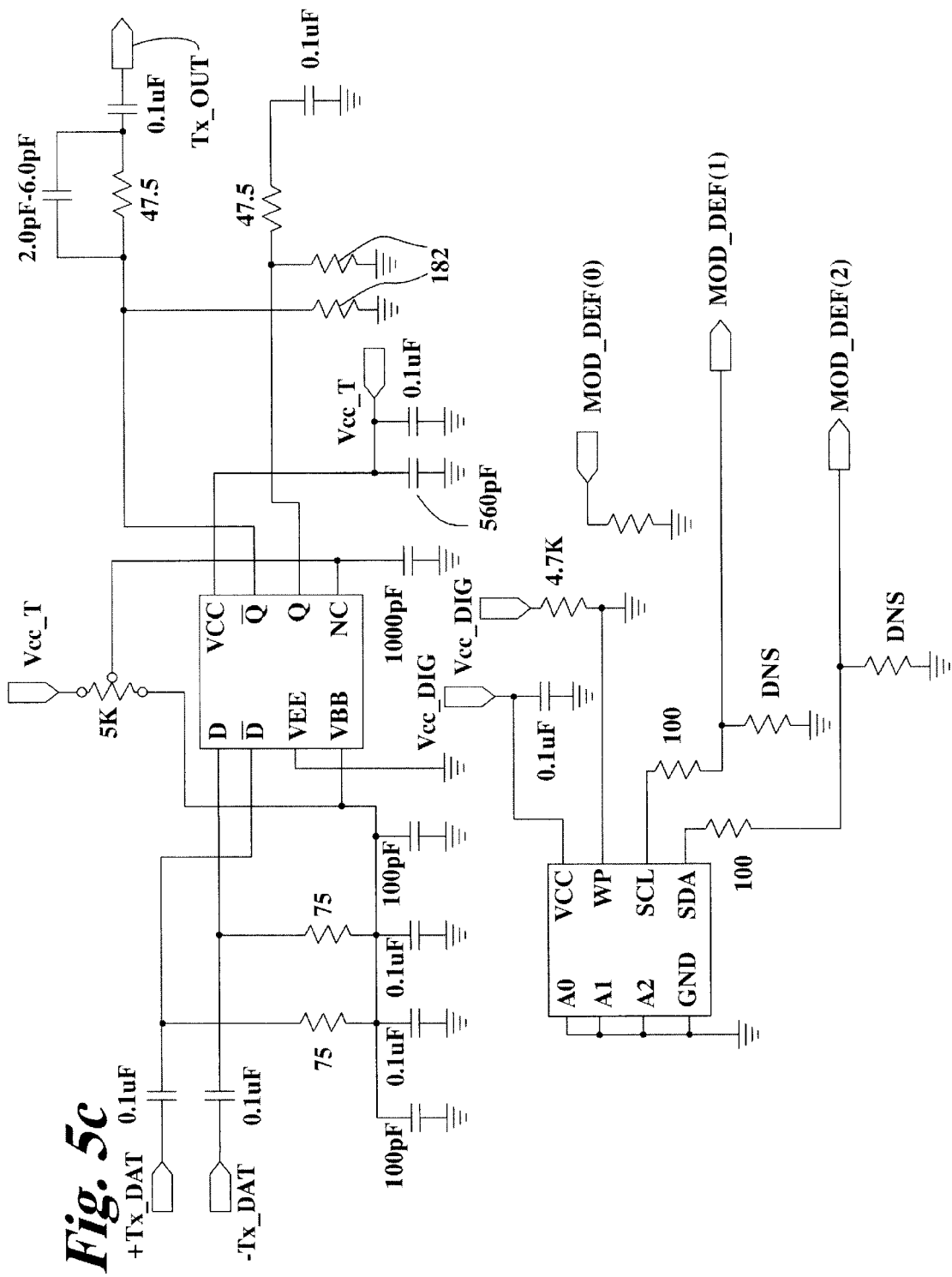
Figure 5D:
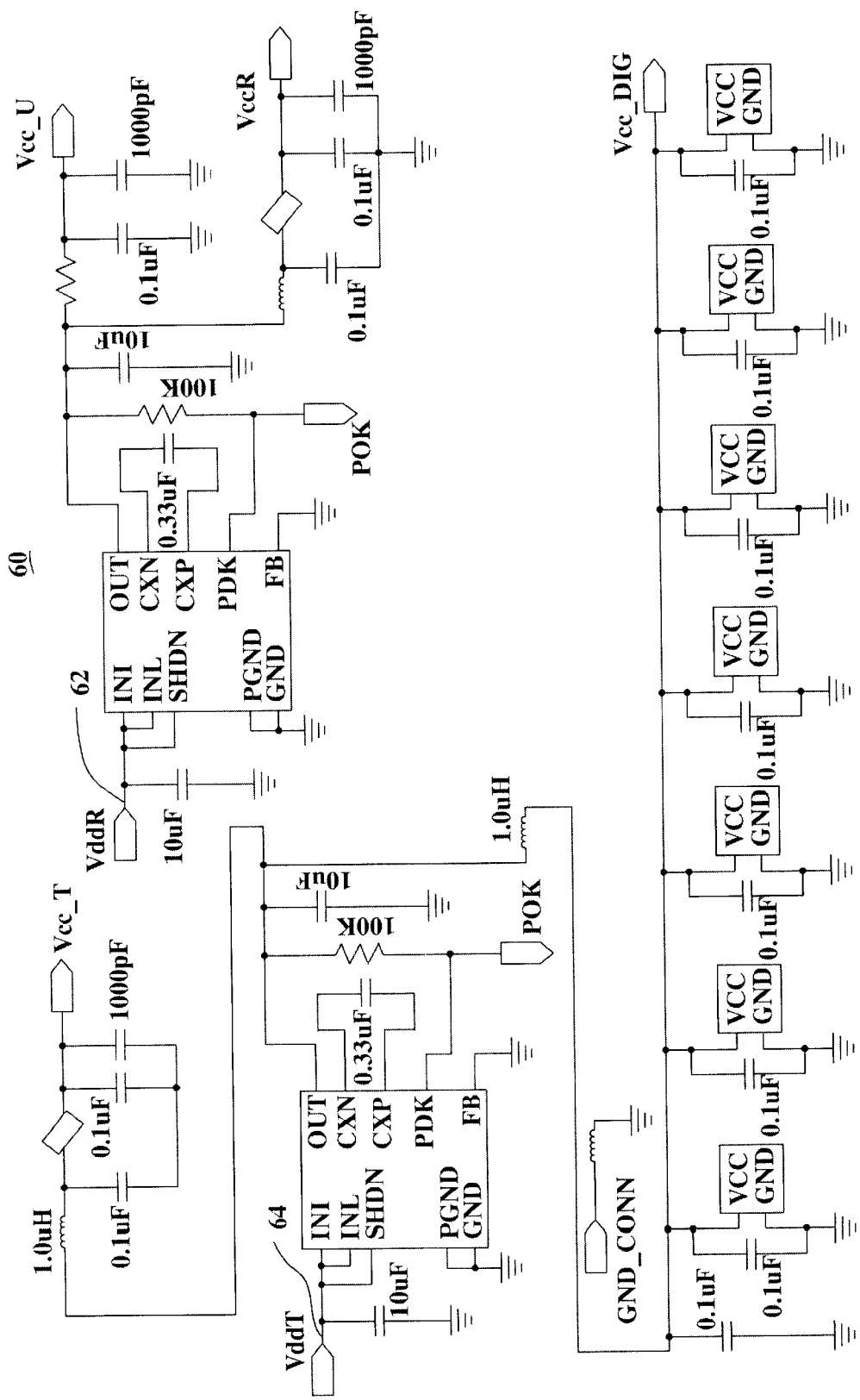

FIGS. 5a–5d are a circuit diagram of a GBIC configured in accordance with the present invention. The present invention preferably incorporates commercially available voltage converting devices. FIG. 5b illustrates the voltage converter 60 shown in FIGS. 3 and 4. The voltage converter 60 incorporates a commercially available voltage converter integrated circuit (IC), the MAX1759 which is manufactured by Maxim Integrated Products Maxim Integrated Products, Sunnyvale, Calif. The MAX1759 chip provides a regulated output voltage of 3.3 volts in response to an input voltage that varies from 1.6 to 5.5 volts. Maxim Integrated Products also produces a voltage converter chip MAX1672, which provides a fixed output voltage of 3.3 volts in response to an input voltage that varies between 1.8 to 11 volts. Documentation on these chips from Maxim Integrated Products is available to the public via the internet on the web page of Maxim Integrated Products.

Figure 6:
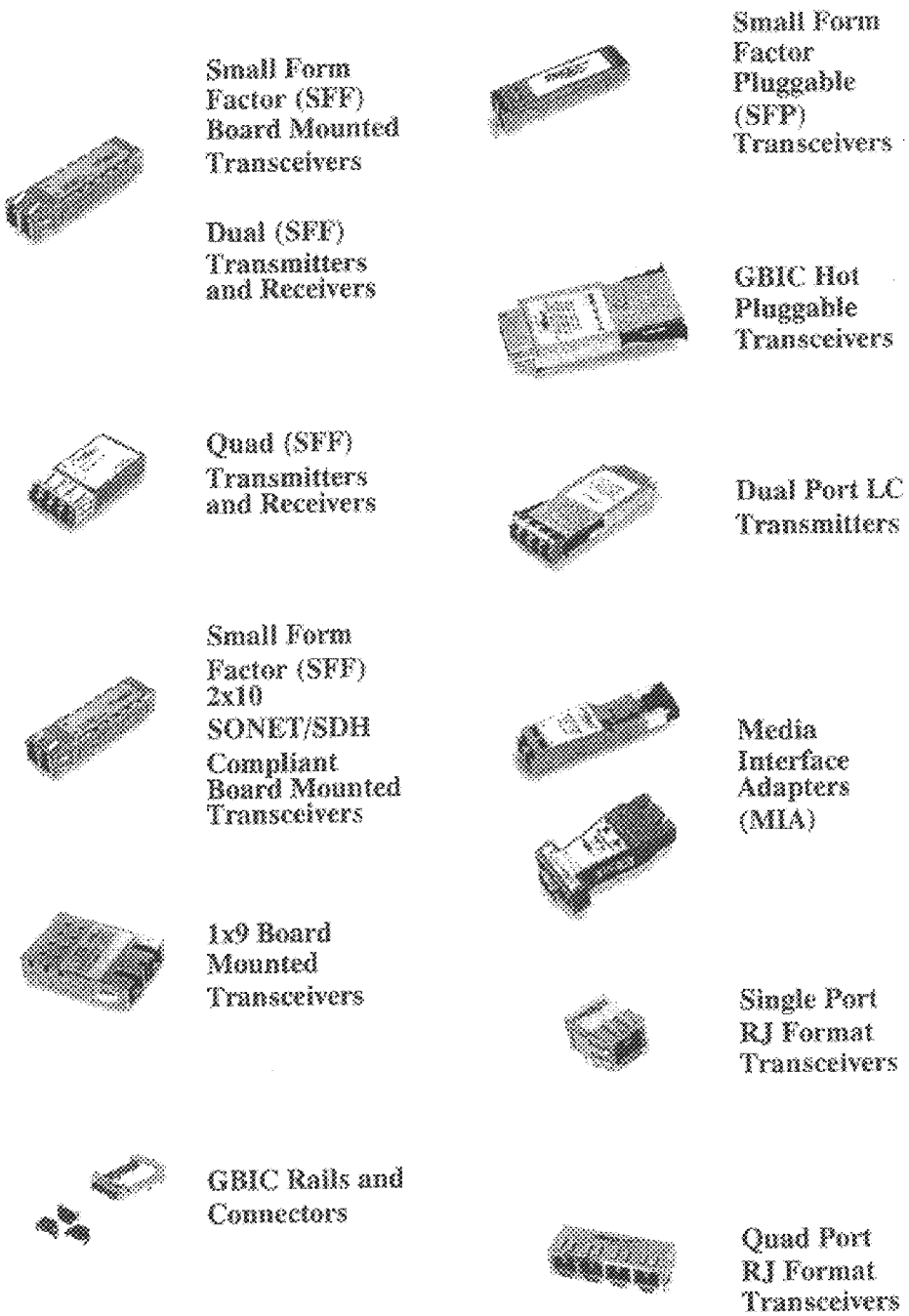
FIG. 6 illustrates various transceiver modules that may incorporate the voltage converter of the present invention.

FIG. 6 illustrates additional transceiver modules that may incorporate the present invention. These devices are manufactured and sold by Stratos Lightwave in Chicago, Ill.

It is to be understood that the foregoing description is merely a disclosure of particular embodiments and is no way intended to limit the scope of the invention. Several possible alterations and modifications will be apparent to those skilled in the art.

We claim as our invention:

1. An optoelectronic transceiver module, comprising:
   a housing having a first opening at a first end and a second opening at a second end;
   a printed circuit board mounted within the housing;
   an electrical connector on the printed circuit board at the first end of the optoelectronic transceiver module, the electrical connector having an insulative mating surface within the first opening and including a first side with electrical contacts in an area oriented substantially parallel to the first side of the insulative mating surface, wherein the electrical contacts slidingly engage a circuit card connector of a host receptacle in order to quickly install and remove the optoelectronic transceiver module from within the circuit card connector;

an optical assembly connected to the printed circuit board at the second end of the optoelectronic transceiver module, the optical assembly including a transmitting optical subassembly and a receiving optical subassembly, the second opening allowing the optical assembly to communicate outside of the housing in order for the optical assembly to be coupled with a duplex fiber optic plug providing for bi-directional data transmission over an optical data link; and a voltage converter circuit within the housing having a predetermined internal output voltage consistent with an internal operating voltage of the optoelectronic transceiver module, wherein an external supply voltage varying within a predetermined range received by the voltage converter is converted to the predetermined internal operating voltage of the optoelectronic transceiver module, thereby enabling the optoelectronic transceiver module to operate properly at various external supply voltages.

2. The optoelectronic transceiver module of claim 1, wherein the internal operating voltage is approximately 3.3 volts.

3. The optoelectronic transceiver module of claim 1, wherein the internal operating voltage is approximately 5 volts.

4. The optoelectronic transceiver module of claim 1, wherein the external supply voltage varies from 1.5 to 5.5 volts.

5. The optoelectronic transceiver module of claim 1, wherein the external supply voltage varies from 1.5 to 11 volts.

6. The optoelectronic transceiver module of claim 1, wherein the optoelectronic transceiver module is a small form factor (SFF) configuration.

7. The optoelectronic transceiver module of claim 1, wherein the optoelectronic transceiver module is a 1×9 configuration.

8. The optoelectronic transceiver module of claim 1 wherein the optoelectronic transceiver module is a small form factor pluggable (SFP) configuration.

9. The optoelectronic transceiver module of claim 1, wherein the optoelectronic transceiver module is a GBIC configuration.

10. An optical transceiver module, comprising:

a housing having a first opening at a first end and a second opening at a second end;

a printed circuit board mounted within the housing;

an electrical pin connector on the printed circuit board at the first end of the transceiver module;

an optical assembly connected to the printed circuit board at the second end of the optoelectronic transceiver module, the optical assembly including a transmitting optical subassembly and a receiving optical subassembly, the second opening allowing the optical assembly to communicate outside of the housing in order for the optical assembly to be coupled with a duplex fiber optic plug providing for bi-directional data transmission over an optical data link; and a voltage converter within the housing having a converter input and a converter output, wherein the voltage converter output outputs a voltage level consistent with a pre-set internal power supply voltage of the optoelectronic transceiver module, the converter input to be connected to an external supply voltage and the voltage converter output is connected to an internal power supply line within the transceiver module, wherein an external supply voltage received by the voltage converter, if required, is converted to the pre-set internal supply voltage level of the transceiver module and transmitted to the internal power supply line of the transceiver module, thereby enabling the optoelectronic transceiver module to operate properly at various external supply voltages.

11. The optoelectronic transceiver module of claim 10, wherein the voltage converter includes a step-up voltage converter and a step-down voltage converter.

12. The optoelectronic transceiver module of claim 10, wherein the voltage converter includes a direct line for passing non-converted voltage levels.

13. The optoelectronic transceiver module of claim 10, wherein the voltage converter includes a switch and a voltage level sensor for directing output of the step-up converter and the step-down converter via the switch.

14. The optoelectronic transceiver module of claim 10, further comprising:

a power management and surge control circuit, and the voltage converter is incorporated into the power management and surge control circuit.

15. A transceiver module, comprising:

a housing having a first end and a second end;

a printed circuit board mounted within the housing;

a first electrical connector having electrical contacts on the printed circuit board at the first end of the transceiver module having a first configuration for mating with a host receptacle;

a second electrical connector on the printed circuit board at the second end of the transceiver module having a second configuration; and a voltage converter circuit within the housing having a predetermined internal output voltage consistent with an internal operating voltage of the transceiver module, wherein an external supply voltage varying within a predetermined range received by the voltage converter is converted to the predetermined internal operating voltage of the transceiver module, thereby enabling the transceiver module to operate properly at various external supply voltages.

16. The transceiver module of claim 15, wherein the voltage converter includes a step-up voltage converter and a step-down voltage converter.

17. The transceiver module of claim 15, wherein the voltage converter includes a direct line for passing non-converted voltage levels.

18. The transceiver module of claim 15, wherein the voltage converter includes a switch and a voltage level sensor for directing output of the step-up converter and the step-down converter via the switch.

19. The transceiver module of claim 15, further comprising:

a power management and surge control circuit, and the voltage converter is incorporated into the power management and surge control circuit.

20. The transceiver module of claim 15, wherein the second electrical connector is an optical assembly including a transmitting optical subassembly and a receiving optical subassembly allowing the optical assembly to communicate outside of the housing in order for the optical assembly to be coupled with a duplex fiber optic plug providing for bi-directional data transmission over an optical data link.

* * * * *